Dec. 10, 1935.　　　F. D. WILLIAMS　　　2,024,081
COMPOSITE PICTURE MAT
Original Filed Aug. 30, 1932　　2 Sheets-Sheet 1
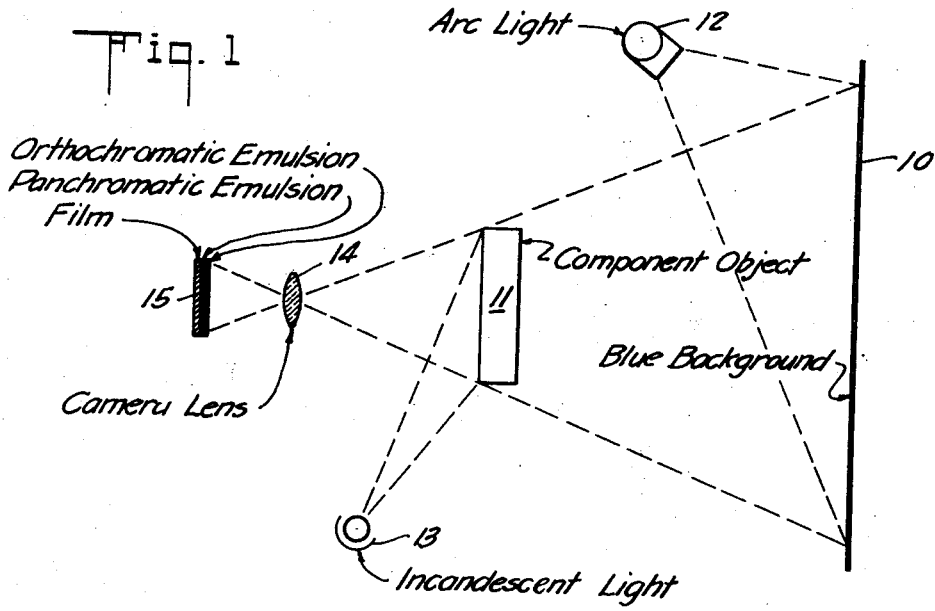
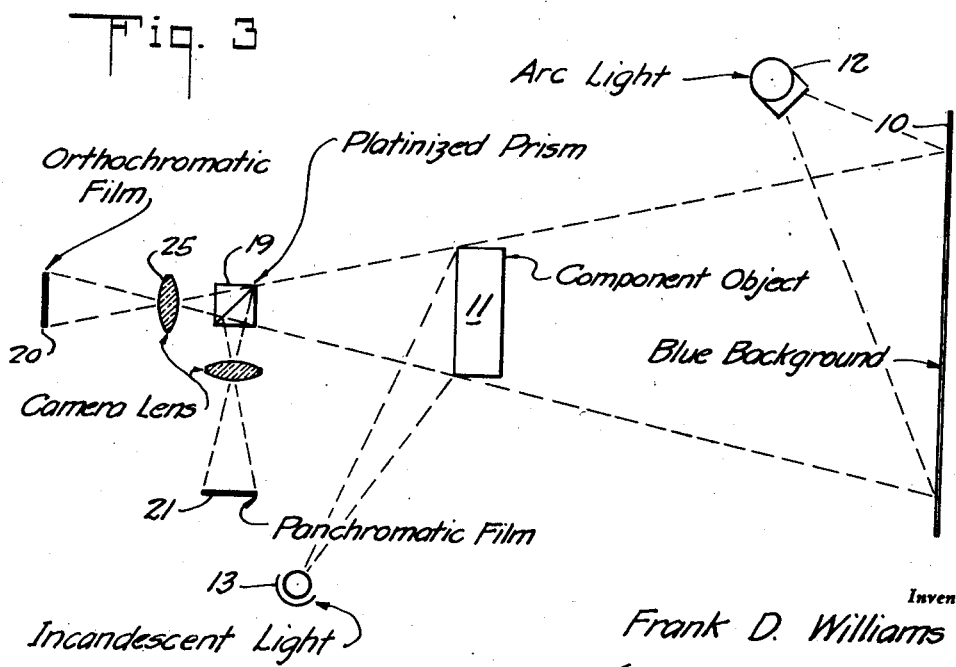
Inventor
Frank D. Williams
By Ernest L. Wallace
Attorney Dec. 10, 1935.  F. D. WILLIAMS  2,024,081
COMPOSITE PICTURE MAT
Original Filed Aug. 30, 1932  2 Sheets-Sheet 2
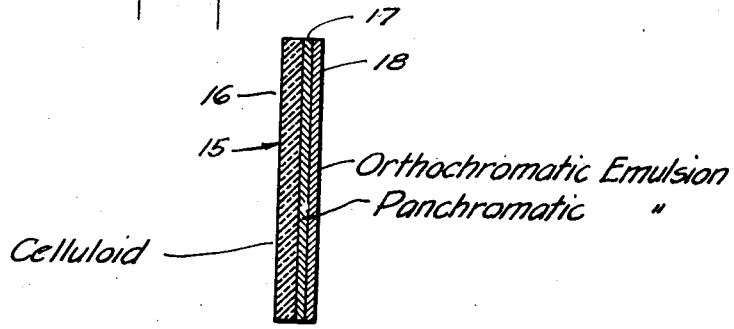
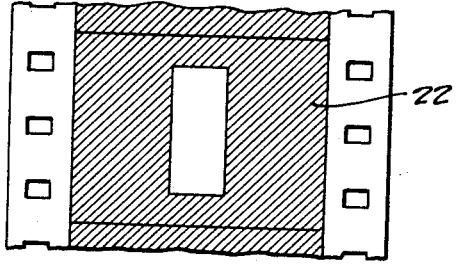
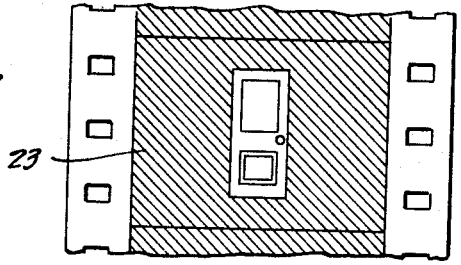
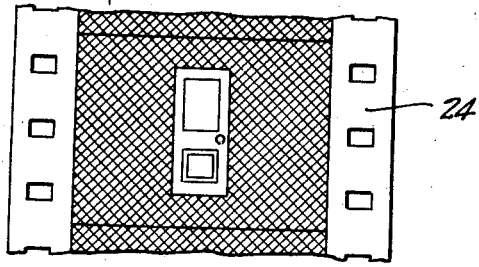
Inventor
Frank D. Williams
By Ernest L. Wallace
Attorney Patented Dec. 10, 1935

2,024,081

UNITED STATES PATENT OFFICE 2,024,081

COMPOSITE PICTURE MAT

Frank D. Williams, Los Angeles, Calif.

Application August 30, 1932, Serial No. 630,984
Renewed April 24, 1935

9 Claims. (Cl. 88—16)

This invention relates to a method of making a mat especially useful in making plural source composite pictures. It relates to photographically making a reverse mat film, or films to be used conjointly as a reverse mat film, having a dense masking background impression and a normal negative detail of a component image. Heretofore, it has been the practice to employ a plurality of printing steps to obtain such a mat film involving reversal of images in printing, difficulty in registration of images, much labor and skill on the part of the operator and necessitating use of precision equipment.

The present invention has for its object the provision of a process whereby two strata of emulsion may be light impressed with the image of an object by a single photographing step to derive therefrom a dense masking background and a normal negative detail of the object. A negative reverse mat must have a substantially opaque background and a clear detail negative image. Heretofore, the background has been made substantially opaque by intensifying, overdevelopment, or overexposure. Obviously, if the detail image also were light impressed on the film and so treated, clear details would not result. For this reason the printing and development of the background and image are commonly separately performed and from plural films a mat film is printed from one of the films. The present invention includes the step of lighting a background with light having chromatic characteristics to which plural strata of emulsions are photochemically responsive, all being highly sensitive to the ground light, and simultaneously light impressing an image on at least one of the emulsions from an object disposed before the background. The primary object is to photographically obtain a dense masking background. Another object of this invention is to provide a film having a single base with two strata of emulsions, the top stratum being orthochromatic and the bottom stratum panchromatic.

These objects are accomplished by the process which may be carried out by the apparatus illustrated in the accompanying drawings. In the drawings—

Fig. 1 is a schematic view of an aggroupment of apparatus and objects arranged to carry out the steps of the preferred specific method; Fig. 2 is a sectional view through the film used with the apparatus shown in Fig. 1; Fig. 3 is a schematic view of an aggroupment of apparatus for carrying out the steps of a variation of the method; Figs. 4 and 5 show developed films resulting from the method used with the apparatus shown in Fig. 3; and Fig. 6 shows the films of Figs. 4 and 5 superposed for masking and printing.

Referring to Fig. 1, the preferred method employs preferably a blue background 10 before which an object 11 is disposed. The object may be intended for production of one image of a plural source picture. The background is illuminated by light predominating in blue, that is, having a higher ratio of blue to red light as compared with white light. A lamp 12 is used for this purpose and is preferably an arc light or bank of arc lights, or other lights of blue ray. The object 11 is lighted by a lamp 13 or bank of lamps which predominate in red or orange, that is having a higher ratio of red to blue light as compared with white light, such as incandescent lamps. The background is preferably highly illuminated. A camera for photographing is indicated by lens 14. In the camera is a single film 15.

The single film has a base which may be the usual celluloid strip 16. On one face of the strip 16 is a stratum of emulsion 17 which is preferably panchromatic. Superposed on the emulsion stratum 17 is a stratum of emulsion 18 which is preferably orthochromatic. The front orthochromatic emulsion 18 is only slightly sensitive to red or orange and very sensitive to the blue background so that it is photochemically affected by the light from the background and for practical purposes unaffected by the red light from the object. The rear emulsion 17 is panchromatic and is sensitive to all colors so that it will be affected by the background and also by the object to produce a detail image of the object thereon. The result is substantially a double exposure of the background on the combined emulsions with a substantial gain in background exposure and a normal exposure of the object. After development, the film shows a negative image of the object with a substantially opaque background. With this reverse mat, the image can be printed dark enough to obtain a silhouette mat with a clear background. The use of such mats to produce a composite picture having another component is well known in the art.

In the method just described, the background 10 may be white and lighted by blue light from 12; or even white light may be used if the background is overlighted so that the background reflects more blue than the object. The object 11 may be lighted with white light, but much better results are obtained with incandescent lamps. A straw filter may be placed over the foreground lights if advisable to obtain better demarcation.

Two films may also be used as illustrated in Fig. 3, a platinized light beam splitter 19 being used to effect matched images on the orthochromatic film 20 and the panchromatic film 21. The orthochromatic film 20 is developed and intensified and produces a masking negative 22 shown in Fig. 4 with an image of the object having no detail. The panchromatic film is developed and produces a negative 23 shown in Fig. 5, having a masking background and a detail negative image. It will be noted that the density of the background in Figs. 4 and 5 is not as great as when the two are superposed as shown in Fig. 6, the cross hatching indicating relative density or opacity. In printing a mat the negatives 22 and 23 are superposed obtaining thereby a dense masking background and resulting in a clear background on the mat without any gray. Also in printing in on the composite positive film the superposed negatives 22 and 23 produce a complete masking of the latent background component.

It will be obvious referring to Fig. 3 that instead of using an orthochromatic film 20, a panchromatic film may be used and a blue light filter interposed between it and the lens 25.

It will be apparent that in this method, the object is to initially obtain a dense masking background for printing the mat and details. Heretofore, efforts have been directed to obtaining a dense silhouette and the masking background has transmitted an appreciable amount of light. Each strata of emulsion has a masking background impressed thereon of the density heretofore secured by other well known methods. In the present method, these masking backgrounds by superposition produce a doubly dense masking background.

Panchromatic film emulsion has a yellow dye and if superposed in front of orthochromatic emulsion would act as a filter. Orthochromatic emulsion has substantially no dye to cause color correction. For this reason the panchromatic emulsion could not be placed in the front of the orthochromatic as the dye in the panchromatic would act as a filter and hold back other than red light. Therefore, for the purpose described the emulsions must be used with the orthochromatic in front. Such film to my knowledge has not heretofore been manufactured or used.

What I claim is:—

1. The method of producing a motion picture reverse mat which comprises photographing on a film the image of an object reflecting light predominately red before a background reflecting predominately blue light of greater intensity than the light from said object, said film comprising a panchromatic emulsion stratum on the front face of a single base and an orthochromatic emulsion stratum superposed over said panchromatic emulsion stratum and facing said object, and developing said film to produce a normal detail negative image corresponding to said object and a substantially non-light-transmissive background thereon.

2. The method of producing a motion picture reverse mat which comprises light impressing a light sensitive film from an object before a background, said film including a single base, an orthochromatic emulsion stratum thereon facing the object and a panchromatic emulsion stratum to the rear of said orthochromatic emulsion with respect to said object, the object reflecting light predominately red and the background reflecting light predominately blue and of greater intensity than the light from said object whereby a latent substantially translucent area corresponding to said object and a latent substantially opaque background thereon are produced on said orthochromatic stratum, and a latent negative detail image corresponding to said object and a latent substantially opaque background are produced on said panchromatic stratum, and developing said film.

3. The method of producing a motion picture reverse mat which comprises disposing in superposed relation strata of two emulsions, said strata being prepared by simultaneously light impressing a stratum of panchromatic emulsion and a stratum of orthochromatic emulsion with the image of an object disposed before a background, the object reflecting light predominately red and the background reflecting light predominately blue and of greater intensity than the light from said object whereby to produce on said orthochromatic emulsion a latent substantially translucent area corresponding to said object and a latent substantially opaque background thereon and to produce on said panchromatic film a latent negative detail image corresponding to said object and a latent substantially opaque background thereon, and developing said emulsion strata.

4. The method of producing a motion picture reverse mat which comprises photographing on a film an object reflecting light predominately red before a background reflecting predominately blue light; said film comprising a single base with a panchromatic emulsion stratum on the front face of said base and an orthochromatic emulsion stratum superposed on said panchromatic emulsion stratum and facing said object, and developing said film to produce a detail negative image corresponding to said object and a background thereon substantially non-transmissive to light.

5. The method of producing a motion picture reverse mat which comprises light impressing a light sensitive film from an object before a background reflecting light predominately blue, said film including a single base, an orthochromatic emulsion stratum and a panchromatic emulsion stratum said film being disposed with said orthochromatic emulsion optically facing said object, the object reflecting light predominately red, whereby a latent substantially translucent area corresponding to said object and a latent substantially opaque background are produced on said orthochromatic stratum, and a latent negative detail image corresponding to said object and a latent substantially opaque backgorund are produced on said panchromatic stratum, and developing said film.

6. The method of producing a motion picture reverse mat which comprises light impressing a light sensitive film from an object before a background, said film including a single base bearing a panchromatic emulsion stratum and a second emulsion stratum, the object reflecting light predominately red and the backgorund reflecting light predominately blue, the second emulsion being restrained to photochemical action by light minus red and disposed to optically face said object whereby a latent substantially translucent area corresponding to said object and a latent substantially opaque background thereon are produced on said second stratum, and a latent negative detail image corresponding to said object and a latent substantially opaque background are produced on said panchromatic stratum, and developing said film.

7. The method of producing a motion picture reverse mat which comprises disposing in superposed relation strata of two emulsions, said strata being prepared by simultaneously light impressing a stratum of panchromatic emulsion and a second stratum of emulsion with the image of an object disposed before a background the object reflecting light predominately red and the background reflecting light predominately blue and of greater intensity than the light from said object, said second emulsion being restrained to photochemical action by light minus red whereby to produce on said second emulsion a latent substantially translucent area corresponding to said object and a latent substantially opaque background thereon and to produce on said panchromatic film a latent negative detail image corresponding to said object and a latent substantially opaque backgorund thereon, and developing said emulsion strata.

8. The method of producing a motion picture reverse mat which comprises photographing on a film the image of an object before a background, said object reflecting less blue light than said background, said film comprising a panchromatic emulsion stratum and an orthochromatic emulsion stratum superposed over said panchromatic emulsion stratum on a single base, said orthochromatic emulsion facing said object, and developing said film to produce a normal detail negative image corresponding to said object and a substantially non-light transmissive background thereon.

9. The method of producing a motion picture reverse mat which comprises light impressing a light sensitive film from an object before a background, said object reflecting less blue light than said background, said film including a single base, an orthochromatic emulsion stratum and a panchromatic emulsion stratum superposed thereon with said orthochromatic emulsion optically facing said object, and developing said film to produce a normal detail negative image corresponding to said object and a substantially non-light-transmissive background thereon.

FRANK D. WILLIAMS.